US010635495B2

(12) United States Patent
Maurer et al.

(10) Patent No.: US 10,635,495 B2
(45) Date of Patent: Apr. 28, 2020

(54) METHOD FOR REGISTERING DEVICES, IN PARTICULAR CONDITIONAL ACCESS DEVICES OR PAYMENT OR VENDING MACHINES, ON A SERVER OF A SYSTEM WHICH COMPRISES A NUMBER OF SUCH DEVICES

(71) Applicant: SKIDATA AG, Grödig/Salzburg (AT)

(72) Inventors: Sebastian Maurer, Klagenfurt am Wörthersee (AT); Ramiz Ismailov, Klagenfurt am Wörthersee (AT); Michael Grafl, Klagenfurt am Wörthersee (AT); Andreas Kerschbaumer, Klagenfurt (AT)

(73) Assignee: SKIDATA AG, Salzburg (AT)

( * ) Notice: Subject to any disclaimer, the term of this patent is extended or adjusted under 35 U.S.C. 154(b) by 152 days.

(21) Appl. No.: 15/593,450

(22) Filed: May 12, 2017

(65) Prior Publication Data
US 2017/0337089 A1 Nov. 23, 2017

(30) Foreign Application Priority Data
May 12, 2016 (EP) .................................... 16169378

(51) Int. Cl.
*G06F 9/50* (2006.01)
*G06Q 20/40* (2012.01)
(Continued)

(52) U.S. Cl.
CPC .......... *G06F 9/5027* (2013.01); *G06Q 20/18* (2013.01); *G06Q 20/202* (2013.01);
(Continued)

(58) Field of Classification Search
CPC .... G06F 9/5027; G06Q 20/18; G06Q 20/202; G06Q 20/206; G06Q 20/3825; G06Q 20/3829; G06Q 20/40; G07F 9/006
(Continued)

(56) References Cited

U.S. PATENT DOCUMENTS 4,584,639 A * 4/1986 Hardy ....................... G06F 9/52
726/2
5,901,229 A * 5/1999 Fujisaki ................. G06Q 20/02
380/30
(Continued)

*Primary Examiner* — Kambiz Zand
*Assistant Examiner* — Mahabub S Ahmed
(74) *Attorney, Agent, or Firm* — Davis & Bujold PLLC; Michael Bujold

(57) ABSTRACT

A method of registering devices (2), in particular access control devices or payment or vending machines, on a server (3) of a system where the device (2) which is to be registered generates a public and a private key with asymmetrical cryptology. The device (2) subsequently transmits a registration request, signed with the device's private key, containing at least one device ID, the device's public key and the login details of a technician. The server (3) verifies the registration request using the device's public key and, after verification, assigns the device (2) to a 'data reception room' where no operational communication with the server (3) occurs. Subsequently, the device (2) is cleared for communication by a technician logged in to the server (3). The device is assigned to an area of the server memory for operationally cleared devices, and a notification of registration is transmitted to the device (2).

9 Claims, 2 Drawing Sheets

(51) Int. Cl.
*G06Q 20/20* (2012.01)
*G06Q 20/38* (2012.01)
*G06Q 20/18* (2012.01)
*G06F 9/00* (2006.01)
*G07F 9/00* (2006.01)

(52) U.S. Cl.
CPC ....... *G06Q 20/206* (2013.01); *G06Q 20/3825* (2013.01); *G06Q 20/3829* (2013.01); *G06Q 20/40* (2013.01); *G07F 9/006* (2013.01)

(58) Field of Classification Search
USPC .......................................................... 726/2
See application file for complete search history.

(56) References Cited

U.S. PATENT DOCUMENTS

| | | | | |
|---|---|---|---|---|
| 7,062,651 | B1 * | 6/2006 | Lapstun ............... | B43K 23/008 713/168 |
| 7,735,117 | B2 * | 6/2010 | Nadalin .............. | G06F 21/6209 709/225 |
| 7,979,899 | B2 * | 7/2011 | Guo ..................... | H04L 63/0823 726/20 |
| 9,438,599 | B1 * | 9/2016 | Yuhan ..................... | H04L 63/10 |
| 9,515,877 | B1 * | 12/2016 | Tempel ............... | H04L 41/0806 |
| 2003/0147536 | A1 * | 8/2003 | Andivahis ............... | H04L 63/06 380/277 |
| 2005/0195975 | A1 * | 9/2005 | Kawakita .............. | H04L 9/0822 380/30 |
| 2005/0289349 | A1 * | 12/2005 | Franke ................. | H04L 9/3247 713/176 |
| 2007/0043682 | A1 * | 2/2007 | Drapkin ............. | G06Q 20/3829 705/71 |
| 2007/0046423 | A1 * | 3/2007 | Baucom ................. | G07F 17/32 340/5.5 |
| 2007/0130617 | A1 * | 6/2007 | Durfee .................... | G06F 21/33 726/5 |
| 2007/0216933 | A1 * | 9/2007 | Hirano ...................... | G06F 9/50 358/1.15 |
| 2007/0237145 | A1 * | 10/2007 | Adhikari ................... | H04L 9/12 370/392 |
| 2007/0265967 | A1 * | 11/2007 | Kahn ....................... | G06F 21/10 705/51 |
| 2011/0161660 | A1 * | 6/2011 | Zhang ................... | H04L 63/061 713/156 |
| 2011/0191581 | A1 * | 8/2011 | Shim ....................... | H04L 67/12 713/158 |
| 2011/0247055 | A1 * | 10/2011 | Guo ..................... | H04L 63/0823 726/4 |
| 2012/0079288 | A1 * | 3/2012 | Hars ....................... | G06F 21/00 713/193 |
| 2012/0254762 | A1 * | 10/2012 | Parmar .................. | G06Q 30/02 715/736 |
| 2014/0089202 | A1 * | 3/2014 | Bond ..................... | H04L 9/0822 705/71 |
| 2014/0143108 | A1 * | 5/2014 | Smith ................ | G06Q 20/3229 705/35 |
| 2014/0257879 | A1 * | 9/2014 | Sink ...................... | G06Q 10/02 705/5 |
| 2014/0372321 | A1 * | 12/2014 | Khan ...................... | G06F 21/31 705/72 |
| 2016/0070892 | A1 * | 3/2016 | Leonard ................. | G06F 21/16 726/26 |
| 2016/0269393 | A1 * | 9/2016 | Corella ................. | H04L 63/083 |
| 2017/0006003 | A1 * | 1/2017 | Zakaria ................. | H04L 63/061 |
| 2018/0007025 | A1 * | 1/2018 | Oberheide ........... | H04L 63/083 |

\* cited by examiner

METHOD FOR REGISTERING DEVICES, IN PARTICULAR CONDITIONAL ACCESS DEVICES OR PAYMENT OR VENDING MACHINES, ON A SERVER OF A SYSTEM WHICH COMPRISES A NUMBER OF SUCH DEVICES

This application claims priority from European patent application serial no. 16169378.3 filed May 12, 2016.

FIELD OF THE INVENTION

The present invention concerns a method for registering devices, in particular conditional access devices or payment or vending machines, on a server of a system which comprises a number of such devices.

BACKGROUND OF THE INVENTION

Methods for registering devices, also called trust establishment of remote devices, are known in the state-of-the-art. Firstly, use of a common secret key (shared secret key) is known. The common secret key is pre-installed or configured on a device which is to be registered, wherein for the purpose of registering the device, a technician initially creates a record for the device containing a device ID, a clearance for operation and the common secret key. The device ID is a unique identifier for the device and may depend on hardware components of the device or also on a random unique string of characters.

The device is subsequently connected to the server, wherein an authentication occurs by means of the device ID and the common secret key; following authentication the device is authorised for operational communication with the server. Following the first interaction and authentication, further login details may be generated in order to increase the security of the operational communication with the server, in particular if the common secret key is known to unauthorised persons.

However, this method has the disadvantage that the common secret key has to be pre-installed on the device, which occurs either by means of automatic installation of a common secret key on all devices or by means of a manual installation or configuration of a different common secret key on each device. A further disadvantage of this method consists in that a technician must know the device ID in order to create the corresponding record on the server for registration purposes. To this end, the device which is to be registered is generally booted up in order to obtain the device ID.

Furthermore, the registration of devices carried out by means of a so-called public key infrastructure (PKI) is known to the state-of-the-art, wherein in this case a device certificate signed by a certification body is stored in the device. The identification and authentication of a device by the server can be carried out on the basis of this certificate, wherein the complexity of this method, in particular in relation to renewal of certificates and the establishment and administration of certificate revocation lists, has proven to be disadvantageous. As a rule, according to the state-of-the-art, devices and servers communicate over a secure connection. This applies equally to the state-of-the-art methods described above as well as to the present invention.

SUMMARY OF THE INVENTION

The aim of the present invention is to propose a method for the registration of devices, in particular conditional access devices or payment or vending machines, on a server of a system which comprises a number of such devices, through the implementation of which the above-mentioned disadvantages may be avoided. In particular, in contrast to a PKI, it shall not be necessary in the present method for the device's public key to be signed by a certification body or for certificate revocation lists to be maintained. Furthermore, it is intended that the need for pre-configuration in the device or server before the registration process begins, will be dispensed with.

Thus a method for the registration of devices, in particular conditional access devices or payment or vending machines, on a server of a system which comprises a number of such devices is proposed, as part of which the device which is to be registered generates a public and a private key with asymmetrical cryptography, wherein the device subsequently transmits a registration request, signed with the device's private key, to the server, containing at least the device ID, the device's generated public key and the login details of a technician, who authorises the establishment of a connection between the device and the server. The technician's login details may, for example, be transmitted to the device upon the device's request, or be entered by the technician before the start of the registration process.

According to the invention, the server verifies the registration request with the device's public key in order to establish whether the device has the requisite private key and following verification assigns the device which is to be registered to a 'device reception room,' i.e., a virtual waiting room in the server memory. As long as the device is assigned to the device reception room, no operational communication with the server can take place. The device in the device reception room is subsequently cleared for operation and operational communication by a technician who is logged into the server using his login details, wherein the device is assigned to an area of the server memory for devices which have been cleared for operation, a so-called operational area, and wherein a notification of registration to the device is generated, containing the server's acceptance of the public key and the clearance for operation and operational communication.

As an alternative to transmitting the notification of registration directly following registration, this may be transmitted after a reboot of the device or after the establishment of a new connection between the device and the server, wherein the device authenticates itself by means of a signature which is verified in the server by means of the public key.

Before clearing the device for operation and operational communication, the technician may configure the device using configuration templates of other devices on the system, or enter a new configuration or assign a configuration to the device.

From this point onwards if the device is located in the operative area, i.e., after registration of the device, the device's notifications to the server are signed with the private key, wherein the server carries out a verification of the notification using the device's public key. Alternatively, the server may transmit login details for operational communication to the device with the notification of registration.

In the context of a further development of the invention, the device's registration request may, in accordance with the state-of-the-art, contain a nonce in order to prevent replay attacks. Further, the request may, in accordance with the state-of-the-art and for the prevention of replay attacks, contain a so-called challenge which is generated by the server. Further, the registration request may contain details which make it possible to identify the device in the device reception room, for example a client ID in the case of a multi-client enabled system.

Furthermore, in the context of further embodiments, the technician may be able to view further data before the clearing of the device for operation and operational communication, for example the name of the technician who authorised the establishment of a connection between the device and the server, the point in time of the registration request generated by the device and device data.

In the context of a further embodiment of the method according to the invention, the public and private keys which are generated in the device which is to be registered, may be valid for a given time, or be replaced by a new key pair for security reasons, wherein this is initiated by the device or the server. Subsequently, a new private and a new public key are generated in the device, wherein the new public key is transmitted to the server and this notification is signed using the old private key. After verification of the signature by the server, the old public key is replaced by the new public key generated by the device, wherein operational communication is carried out using the new key pair.

If a key pair is to be blocked or revoked, which may for example be the case if a device has been stolen or hacked, the device's public key is deactivated on the server by a technician, whereby the device is assigned to the device reception room, i.e., the virtual waiting room in the server memory. As long as the device is assigned to the device reception room, no operational communication with the server can take place. When the security problems are remedied, the device, or a new device, is newly registered as set out above, by generating a public and a private key and transmitting to the server a registration request signed using the device's private key.

BRIEF DESCRIPTION OF THE DRAWINGS

The invention will now be explained in more detail below by way of example with reference to the attached drawings.

DETAILED DESCRIPTION OF THE PREFERRED EMBODIMENTS

Figure 1:
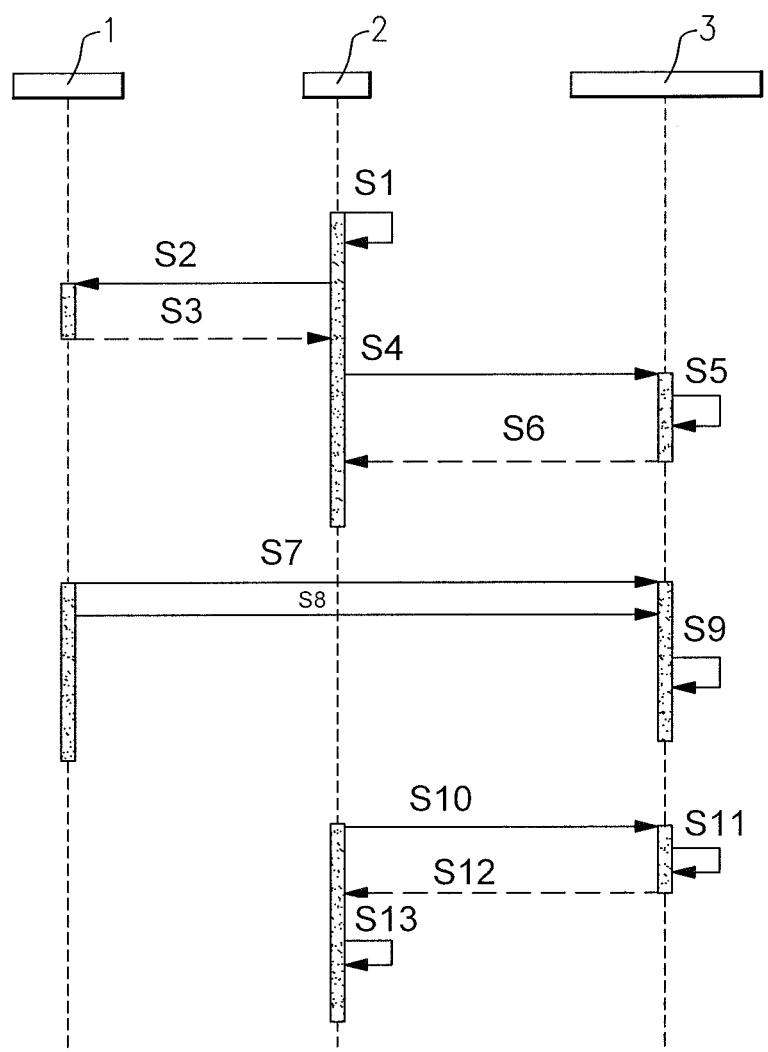
FIG. 1 shows a flow diagram illustrating the registration process according to the invention.

In FIG. 1 a technician is indicated by a 1, wherein a device which is to be registered with a server in a system comprising a number of such devices is indicated by a 2 and the server with a 3. The device 2 may for example be a conditional access device of a conditional access system in a ski resort, or a payment or vending machine.

At the beginning of the process, the device 2 which is to be registered generates a public and a private key with asymmetric cryptology (step S1) and requests login details from a logged-in technician (step S2), wherein, having obtained the login details (step S3) the device 2 transmits (step S4) a registration request signed with the device's private key to the server 3, wherein the registration request contains at least one unique device ID, the device's public key and the technician's 1 login details. The login details serve to authenticate the registration request; using the login details, the establishment of a connection to the server 3 and thus the registration are authorised.

In a next step (step S5), the registration request is verified by the server 3 using the device's 2 public key, wherein, after verification, the device 2, which is to be registered, is assigned to a 'device reception room', i.e., a virtual waiting room in the server 3 memory. Subsequently, the server 3 transmits (step S6) the verification to the device 2.

Subsequently, the device 2 in the device reception room is cleared (step S8) for operating and operational communications by a technician 1 who has logged into the server 3 (step S7) using his/her login details, wherein the device is assigned (step S9) to an area of the server 3 memory which is for operationally cleared devices, a so-called operational area.

In the example shown, a renewed connection between the device 2 and the server 3 is established, wherein the device 2 authenticates itself (step S10) using a signature, wherein after verification of the signature in the server 3 (step S11) by means of the public key, a notification of the registration is transmitted (step S12) to the device 2, which from that point onwards is cleared (step S13) for operation and operational communications.

Figure 2:
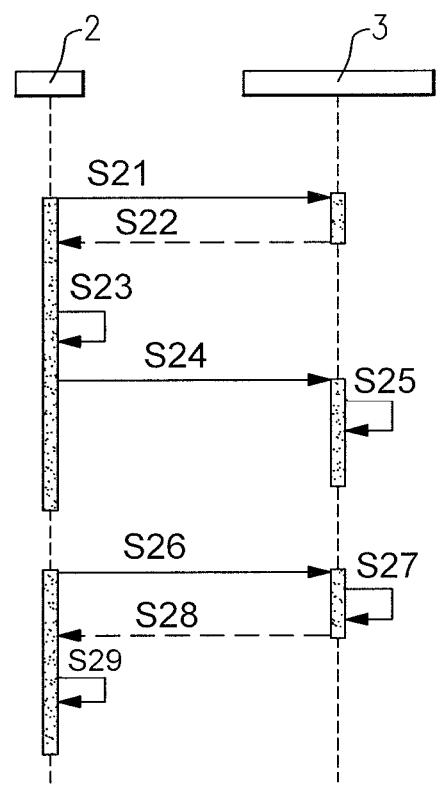
FIG. 2 shows a flow diagram illustrating the procedure for generating a new public and private key according to the invention.

The subject matter of FIG. 2 is a flow diagram to illustrate an exemplary procedure for generating new public and private keys for a registered device 2.

In the depicted example, the generation of the new key pair is requested (step S22) by the server 3 after a connection between the device 2 and the server 3 is established (step S21). A new private and a new public key are subsequently generated (step S23) in the device 2, wherein the new public key is transmitted to the server 3 and this notification is signed (step S24) using the old private key. After verification of the signature by the server 3 using the old public key, the old public key is replaced (step S25) with the new public key generated by the device 2, wherein operational communications are carried out with the new key pair (steps S26, S27, S28, S29). In the example shown, once the old public key is replaced in the server 3 with new public key, a connection is established between the device 2 and the server 3, wherein the device uses (step S26) a signature created with the new key pair for authentication, wherein the server verifies (step S27) the signature and confirms (step S28) the verification using the new public key, and wherein the device 2 is subsequently cleared for operation and operational communication (step S29).

The invention claimed is:

1. A method of registering conditional access devices or payment or vending machine devices, on a server (3) of a system which comprises a number of such registered devices (2), the method comprising:

generating a public and a private key with asymmetrical cryptography, via a new device (2) to be registered, requesting login details of a technician, via the new device (2) to be registered, subsequently transmitting a registration request to the server (3), via the new device (2) to be registered, by signing the registration request with the private key of the new device (2) to be registered, the registration request containing at least one device ID, the public key of the new device (2) to be registered, and the login details of the technician, authenticating the registration request via establishment of a connection between the new device (2) to be registered and the server (3) and the login details of the technician, verifying, via the server (3), the registration request using the public key of the new device (2) to be registered and, following the verification, assigning, via the server (3), the new device (2) to be registered to a 'device reception room', a virtual, waiting room within a memory of the server (3), preventing, via the server (3), operational communication by the device (2) to be registered with the server (3) from occurring as long as the new device to be registered is assigned to the 'device reception room,' subsequently clearing the new device (2) to be registered in the 'device reception room' to operate and for operational communication with the server, via the technician logging into the server (3), using his/her login details, assigning the new device (2) to be registered to an area of the memory of the server (3) for operationally authorized devices, and transmitting to the new device (2) to be registered a notification of completed registration.

2. The method according to claim 1, further comprising transmitting the notification of registration to the new device (2) to be registered, the notification containing the acceptance of the public key by the server (3) and the clearance to operate and the clearance for operational communications, the notification being transmitted directly to the new device (2) to be registered following registration, or after a reboot of the new device (2) to be registered or after the establishment of a new connection between the new device (2) to be registered and the server (3).

3. The method according to claim 1, further comprising, following registration of the new device to be registered, signing the notifications of the new device (2) to be registered to the server (3) with the private key, carrying out, via the server (3), a verification of the notification by the public key of the new device (2) to be registered, or transmitting, via the server (3), login details for operational communication to the new device (2) to be registered with the notification of registration.

4. The method according to claim 2, further comprising, following registration of the new device to be registered, signing the notifications of the new device (2) to be registered to the server (3) with the private key, carrying out, via the server (3), a verification of the notification by the public key of the new device (2) to be registered, or transmitting, via the server (3), login details for operational communication to the new device (2) to be registered with the notification of registration.

5. The method according to claim 1, further comprising, before clearance for operation and operational communication, configuring the new device (2) to be registered or assigning a new configuration using configuration templates from other devices on the system.

6. The method according to claim 2, further comprising, before clearance for operation and operational communication, configuring the new device (2) to be registered or assigning a new configuration using configuration templates from other devices on the system.

7. The method according to claim 3, further comprising, before clearance for operation and operational communication, configuring the new device (2) to be registered or assigning a new configuration using configuration templates from other devices on the system.

8. The method according to claim 4, further comprising, before clearance for operation and operational communication, configuring the new device (2) to be registered or assigning a new configuration using configuration templates from other devices on the system.

9. The method according to claim 4, further comprising generating in the new device (2) to be registered the public and private keys which are valid for a predefined time, or for security reasons are replaced by a new key pair, initiating the generation of a new key pair by the new device (2) to be registered or the server (3), whereby a new private and a new public key are generated in the new device (2) to be registered, transmitting the new public key to the server (3) and this is signed using the old private key, after verification of the signature by the server (3), replacing the old public key with the new public key generated by the new device (2) to be registered, and carrying out operational communication using the new key pair.

* * * * *